United States Patent [19]

French

[11] Patent Number: 4,796,350

[45] Date of Patent: Jan. 10, 1989

[54] METHOD OF USING PORTABLE APPARATUS FOR UNITIZING ROOF SCHEMES

[76] Inventor: Christopher W. French, 27614 Renwick Ct., Saugus, Calif. 91350

[21] Appl. No.: 18,488

[22] Filed: Feb. 24, 1987

[51] Int. Cl.$^4$ .................................... B23P 11/00

[52] U.S. Cl. .................................... 29/432; 29/798; 52/92; 52/478; 269/9; 269/16; 269/17; 269/910; 227/119

[58] Field of Search .................. 29/432, 798; 227/119; 269/9, 161, 17, 910; 52/92, 478

[56] References Cited

U.S. PATENT DOCUMENTS

| | | | |
|---|---|---|---|
| 2,754,862 | 7/1956 | Kemp, Jr. | 269/9 |
| 2,882,557 | 4/1959 | Jaeger | 52/92 |
| 3,036,609 | 5/1962 | Quesenberry, Jr. | 269/910 X |
| 3,500,597 | 3/1970 | McKenzie | 52/92 |
| 3,601,882 | 8/1971 | McRae | 29/432 |
| 3,624,889 | 12/1971 | Greenhalgh | 29/771 |
| 3,629,931 | 12/1971 | Stanley | 29/432 |
| 4,578,909 | 4/1986 | Henley et al. | 52/92 X |

*Primary Examiner*—Charlie T. Moon
*Attorney, Agent, or Firm*—Frank L. Zugelter

[57] ABSTRACT

A jig comprising a support frame rectangularly-configured having first and second longitudinal sides, against the first of which a major beam is to be clamped. A pair of spaced pattern members are fixedly positioned on the frame and in which minor beams are mounted in contemplation of being secured (nailed) to the major beam and assembled, joined secured roofing panels. The pattern members include spaced notches to receive the minor beams in a perpendicular attitude to the clamped major beam. An outwardly upwardly inclining rack mounted along the second longitudinal side mounts the panels for assembly, joining and stapling in sequential fashion. Then the panels are mounted on the major beam and minor beams on the support frame, with an overhanging edge of the panels aligned with the centerline of the clamped major beam by aligning means on the jig. All are nailed together into a unitized roof scheme, removed from the jig and hoisted to the roofing area of a building slelton for installation, and assembled to a major beam already installed. Means are provided to change positioning for different lengthed minor beams and for different thicknesses of the major beam. The jig is portable, having utility at job site.

8 Claims, 6 Drawing Sheets

FIG. 6.
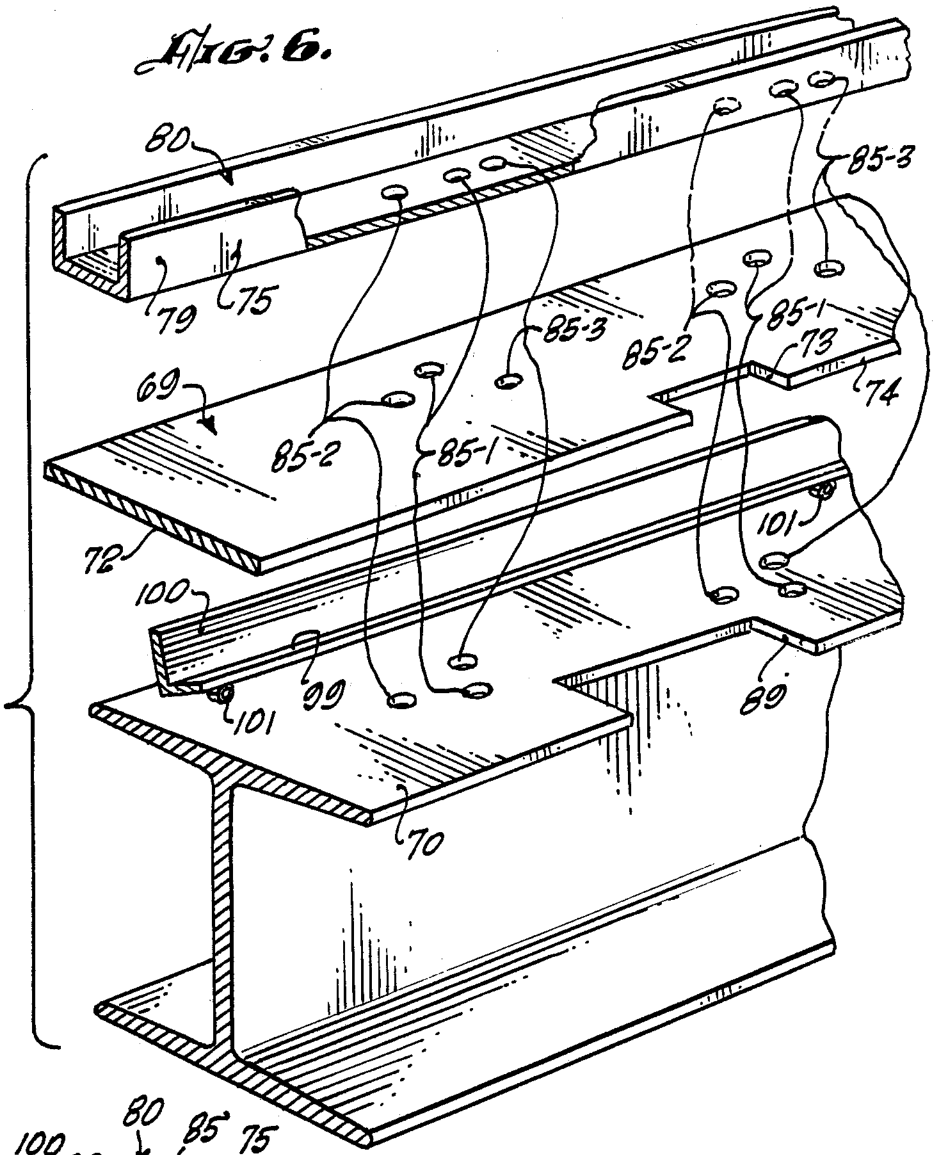
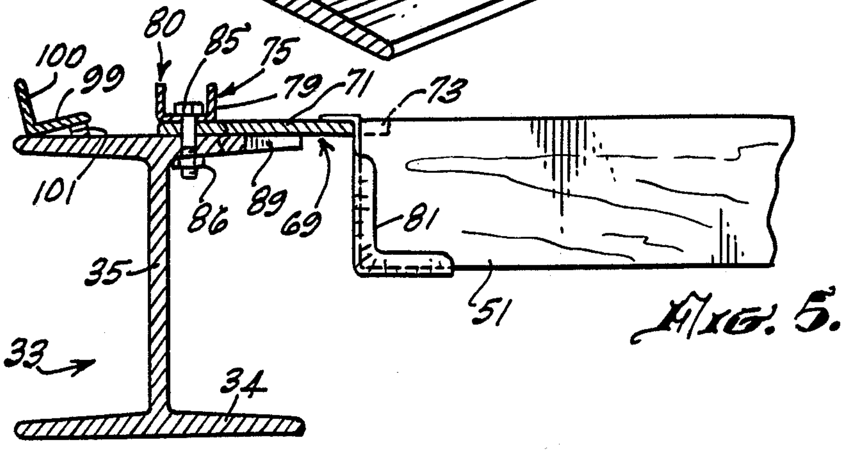
FIG. 5.

METHOD OF USING PORTABLE APPARATUS FOR UNITIZING ROOF SCHEMES

TECHNICAL FIELD

This invention relates to the fabrication of a panelized roofing scheme, and more particular to an apparatus and method by which panels are assembled and secured together, and then thereafter secured to a major beam and a plurality of minor beams, all of which constituting a unitized roofing scheme.

BACKGROUND ART

Disclosures of jig apparata and methods by which wall frames and roofs are fabricated, are set forth in the following prior art teachings: U.S. Pat. Nos. 2,754,862; 2,882,557; 3,036,609; 3,109,640; 3,282,012; 3,500,597; 3,624,889; 3,629;931; 3,643,935; and 4,578,909.

PROBLEMS IN THE ART AND SUMMARY OF INVENTION

In today's construction techniques, much of the construction of buildings, particularly light industrial buildings having rectangularly-shaped roofing, still follows the traditional procedures of placing, through carpentry practices, the major beams, such as purlins, in place with carrying beams first, and then following up by installing minor beams, such as sub-purlins, after which plywood panels are mounted and secured thereto through ordinary manual nailing techniques. Many carpenters and other construction workers are required in the roofing area to complete installation of these roofing sub-structures. The cost of labor has drastically increased over the years in the construction trades. It is a major concern in bidding on a construction of a building, and particularly to installation of roofing schemes themselves, that the cost of labor is critically examined, in order to provide a competitive bid.

Also, because of errors that creep into assemblying by traditional methods roofing schemes, additional time, labor and materials are required to correct carpentry errors during and after the construction of a conventional roofing scheme, in order for approval under building code and design criterias.

This invention not only eliminates the necessity of correcting such errors, by the nature of the accuracy of operation in the invention itself, but its utilization also drastically reduces the cost of labor that is required in the installation of a roofing scheme or system in a building, particularly as to a flat roofing scheme.

In summary, the invention is directed to a jig formed in terms of a support frame rectangularly-configured and having elongated or longitudinal first and second sides, against the first side of which the major beam or purlin is to be clamped. A pair of pattern members are positioned on the frame and by which the minor beams or sub-purlins are transversely spacedly mounted along the length of the support frame, in contemplation of being secured with the purlins to the assembled panels. Each of these pattern members includes a plurality of spaced notches or recesses in which the sub-purlins are correspondingly seated, to be arranged in perpendicular attitude to the major beam or purlin clamped to the one side of the support frame. The means by which the panels are assembled and secured to one another for mounting on and securing to the sub-purlins and purlin is an outwardly inclined, upwardly extending rack including standards and cross-members that are mounted along and above the second longitudinal side of the frame, so that work personnel, standing on a metal grating or "catwalk" on the support frame, can mount a plurality of such panels, usually 8'×4' in size, onto the rack. They are accurately mounted in sequential fashion along the rack, and thereafter, their eight-foot edges are stapled or otherwise fastened together. After stapling, the joined panels then are mounted over and upon the sub-purlins and purlin that are already mounted to and positioned in their pattern members and clamp in the support frame. One edge of the sequentialed 4' lengths of the assembled panels is pushed against a straight edge along the second side of the frame, at a predetermined distance from the centerline of the major beam or purlin clamped to the support frame. Thus, a predetermined overhang for opposing edges of assembled panels relative to the ends of the sub-purlins and the centerline of the purlin has been incorporated into the final roofing scheme of panels, sub-purlins, and purlins. With the edges of the sequentialed 4' lengths of the assembled panels being squared with such straight edge, then the panels are nailed to the sub-purlins and purlin. The entire unit is ready for removal from the jig, and raised, such as by a fork lift or the like, to the roof elevation of a building, at and to which it is then assembled to a previous roofing section or purlin already installed in the building. As the entire unit is mounted at once, in place on the roof, no misfitted panels occur and which would require additional time and labor to correct. By utilization of this jig and method, an accurate and unitized roofing scheme is fabricated prior to its installation upon its building. The jig provides versatility by adapting its elements to meet changes in lengths of subpurlins and in the different thicknesses of purlins, found in today's roofing construction climates.

AN OBJECT OF THIS INVENTION

An object of the invention is to provide a novel jig and method for assembling and incorporating panels into a roofing scheme.

A further object of this invention is to fabricate a roofing scheme independently of the building to which it is to be mounted.

Another object of the invention is to remove bowing in a horizontal plane for the major beam or purlin, thus assuring a precisely arranged and squared roofing scheme.

A further object of the invention is to eliminate the necessity of correcting carpentry errors that heretofore have crept into the construction of roofing on a building, by an accurate alignment of squared panels one to another and to major and minor beams.

A further object of the invention is to provide portability to the support frame so that the jig is readily available at each and every construction site at which the roofing scheme is to be utilized, as compared with building "prefabs" or wall frame schemes or the like in a factory, and hauling them off to the construction site itself.

Another object of the invention is to reduce the time required at construction site to install a roofing scheme.

Another important object of the invention is to provide versatility in positioning one of the pattern members to accomodate major beams or purlins of varying thicknesses.

A further object of the invention is to provide versatility for the other of the pattern members to accomodate minor beams or subpurlins of varying thicknesses.

Another object of the invention is to reduce labor costs in the construction of roofs.

Another object of the invention is to provide preciseness in the assembling and mounting of roof panels on a building skeleton, to thereby form a more sound roofing panelization for the building.

A further object of this invention is to provide accommodation in the jig for varying depths (width of beam) of a major beam clamped to the jig.

These and other objects and advantages will become more apparent upon a complete and full reading of the following description, the appended claims thereto, and the accompanying drawing comprising 6 sheets of 19 FIGURES.

BRIEF DESCRIPTION OF THE DRAWING

FIG. 5 is a view taken on line 5—5 of FIG. 4*a*.

FIG. 6 is a perspective composite but exploded view of the illustrations shown separately in FIGS. 4*a*, 4*b*, and 4*c*.

BEST MODE FOR CARRYING OUT THE INVENTION

Figure 1:
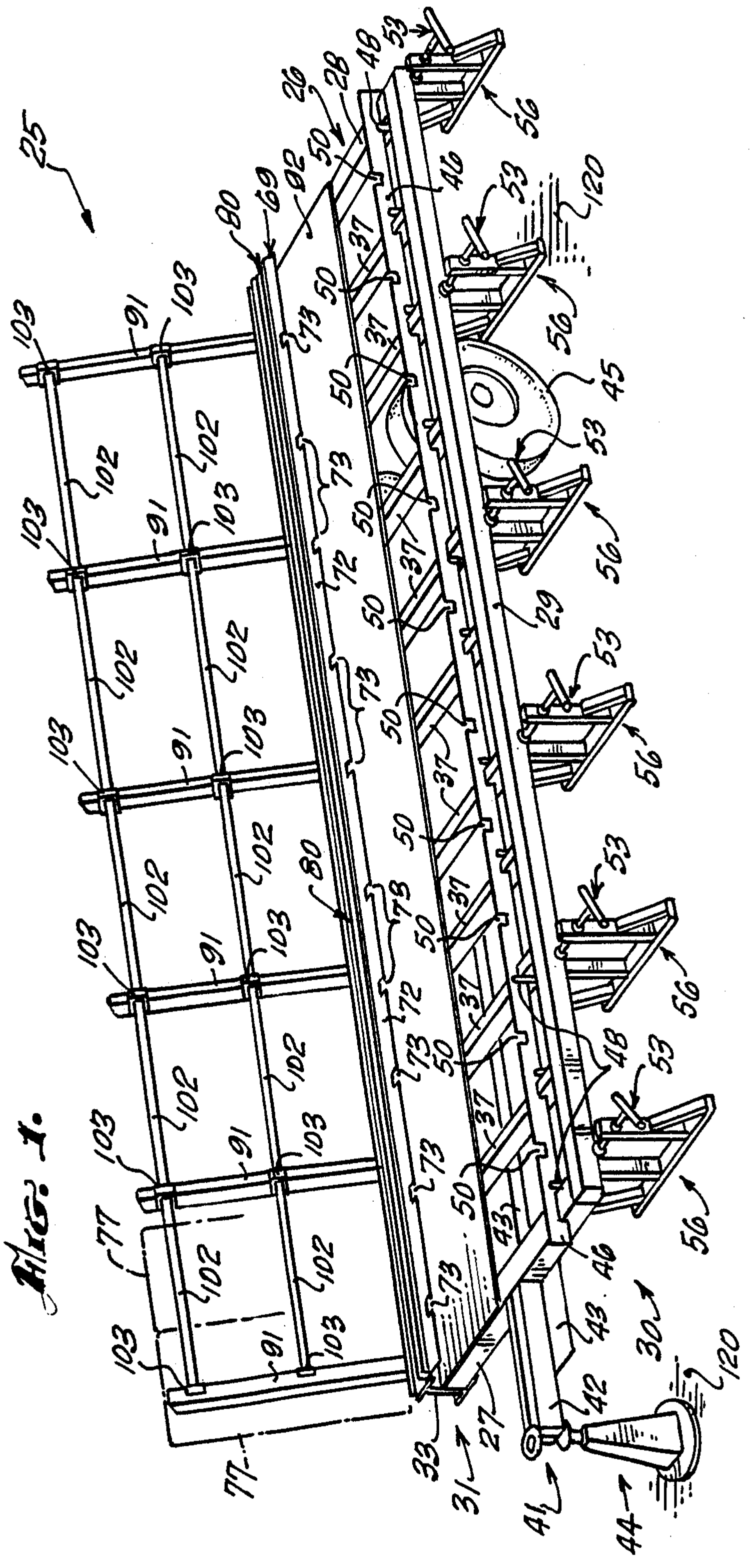
FIG. 1 is a perspective view of a jig embodying the invention.

Referring now to the drawing wherein reference characters correspond to like numerals hereinafter, FIG. 1 illustrates a jig 25 of the invention, ready for utilization in unitizing a roofing scheme independently of a building's roof. Jig 25 comprises a support frame 26 composed of front-and-rear laterally extending steel tubular members 27, 28, joined to an elongated steel tubular member 29 on a first longitudinal side 30 of support frame 25 and joined at a second or other longitudinal side 31, FIG. 2, to an elongated I-beam 33. Tubular members 27, 28 set on the inner portion of lower flange 34 of I-beam 33, the latter's web 35 extending above the tops of members 27, 28, 29, FIG. 2. These four members 27, 28, 29, 33, are secured together by welding to form support frame 26 that is rectangular in nature. Support frame 26 includes a plurality of spaced steel tubular cross-members 37 welded along and to the first side's member 29, and to I-beam 33 against its inner flange 34 and web 35, to assure a rectangular-configured, or "squared" so to speak, support frame 26. The entire support frame 26 is made portable then, by securely mounting it, such as by welding, to spring leaf supports 38 in the form of longitudinally arranged tubular steel members welded to the undersides of several cross-members 37 towards the rear of the jig. Spring leaf supports 38 in turn are operatively connected to conventional spring leaf means, not necessary to detail here, in known manner, and thus to a wheel axle 40. At the front end of jig 25, a hitch means 41 comprising a tongue 42 is welded to a steel tubular member 43 centrally located in jig 25 and which in turn is welded to a number of cross-members 37. Tubular member 43 extends longitudinally rearwardly of frame 26. A hitch support stand 44 is set under hitch tongue 42, to support the front end of jig 25, in either its operational or non-operational mode of use. Hitch tongue 42 is connected to any suitable power vehicle to transport jig 25 via wheel tires 45 from one construction site to the next.

Figure 7:
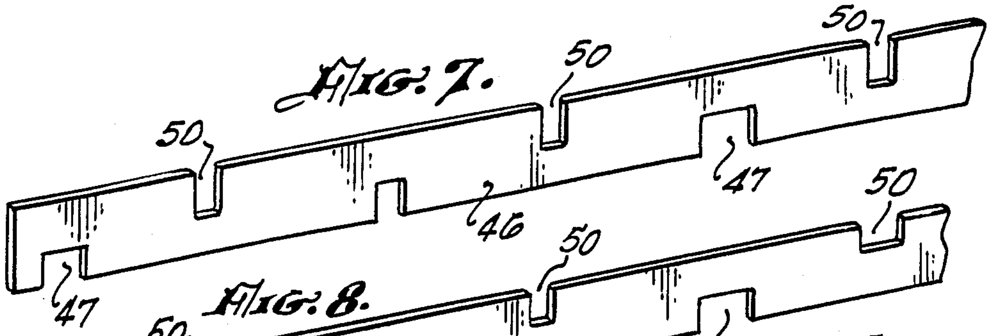
FIGS. 7, 8, and 9 are perspective fragmentary views of various first pattern members.

A first pattern member 46, FIGS. 1, 7, in the form of an elongated straight or flat metal plate, is mounted longitudinally of jig 25, across end members 27, 28 and cross-members 37, in substantial parallel arrangement and proximity to elongated member 29. Bottom slots 47 mount plate member 46 to frame members 27, 28, 37 to longitudinally position the pattern member while bifurcated brackets 48 welded to the vertically-oriented sides of frame members 27, 28, 37 prevent tipping or swinging in lateral directions of pattern member 46. A plurality of notches 50 are spacedly mounted in pattern member 46, extending upwardly of frame 26, for seating of corresponding subpurlins 51 (minor beams), FIG. 2.

Figure 11:
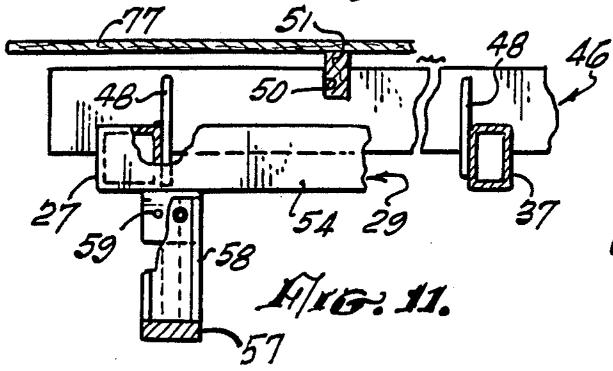
FIG. 11 is a view taken on line 11—11 of FIG. 2.

The ends of subpurlins 51 along side 30 of frame 26 are adapted to substantially abut a perlin 52 (major beam) securely mounted to elongated frame member 29. Purlin 52 is adapted to be clamped by a plurality of clamping means 53 to frame member 29 along its one vertically-oriented edge 54. Each clamp 53 is preferably included in a beam rest support 56 which also provides for adjusting the height of the beam or purlin 52 prior to clamping it to edge 54. Each beam rest support 56 comprises a base 57 for purlin 52. A hanger 58 is secured to base 57 and attaches, by means of bolts 59, FIG. 11, the support 56 to a bracket 60 welded to the underside of and depending from a corresponding frame member 27, 28, 37. Clamp 53 comprises a jack-screw arangement 61 or the like mounted in an upright member 62 secured to base 57 and braced in its position by an inclined bracing channel membeer 63. A handle 64 is provided on each jack-screw 61 for tightening its clamping plate 65 against a purlin 52 being clamped to edge 54. Thus, clamping all the clamps eliminates bowing in purlin 52. Another hanger 66 is pivotally attached, as by a bolt 67, FIG. 2, to a vertically-oriented side of a corresponding tubular member 27, 28, 37 and is secured to base 57 to prevent rocking of beam rest support 56 as clamp 53 is tightened. Beam rest support 56 includes a depth in which one or more wood blocks 68 are utilized to adjust the height of purlin 52 prior to clamping it against edge 54, in order to obtain the desired substantially flush relationship with the tops of subpurlins 51 supported by the first pattern member 46 and its cooperating second pattern member 69 hereinafter now described. Turning now to the second side 31 of jig 25, FIGS. 1, 2, 4*a*–4*d*, 5, and 6, it will be observed that the second pattern member 69 is adapted to be securely mounted along and upon the top flange 70 of I-beam 33. Top flange 70 of the I-beam 33 is disposed at such a level that a top surface 71, FIG. 5, of second pattern member 69 lies substantially in the plane of the top of the subpurlins 51 which are to be mounted in jig 25 in substantial parallel fashion to the plane of support frame 26. The second pattern member 69 comprises an elongated plate 72 having spaced notches 73 formed therein along its one edge 74 which faces the center or side 30 of FIG. 25. The spacing between adjacent notches 73 corresponds with the spacing of adjacent notches 50 in pattern member 46, while each pair of cooperating notches 50, 73 is parallel to front-and-rear frame members 27, 28, and cross-members 37, so that each subpurlin 51 mounted in a pair of cooperating notches 50, 73 is perpendicular to a clamped purlin 52.

Figures 2, 3:
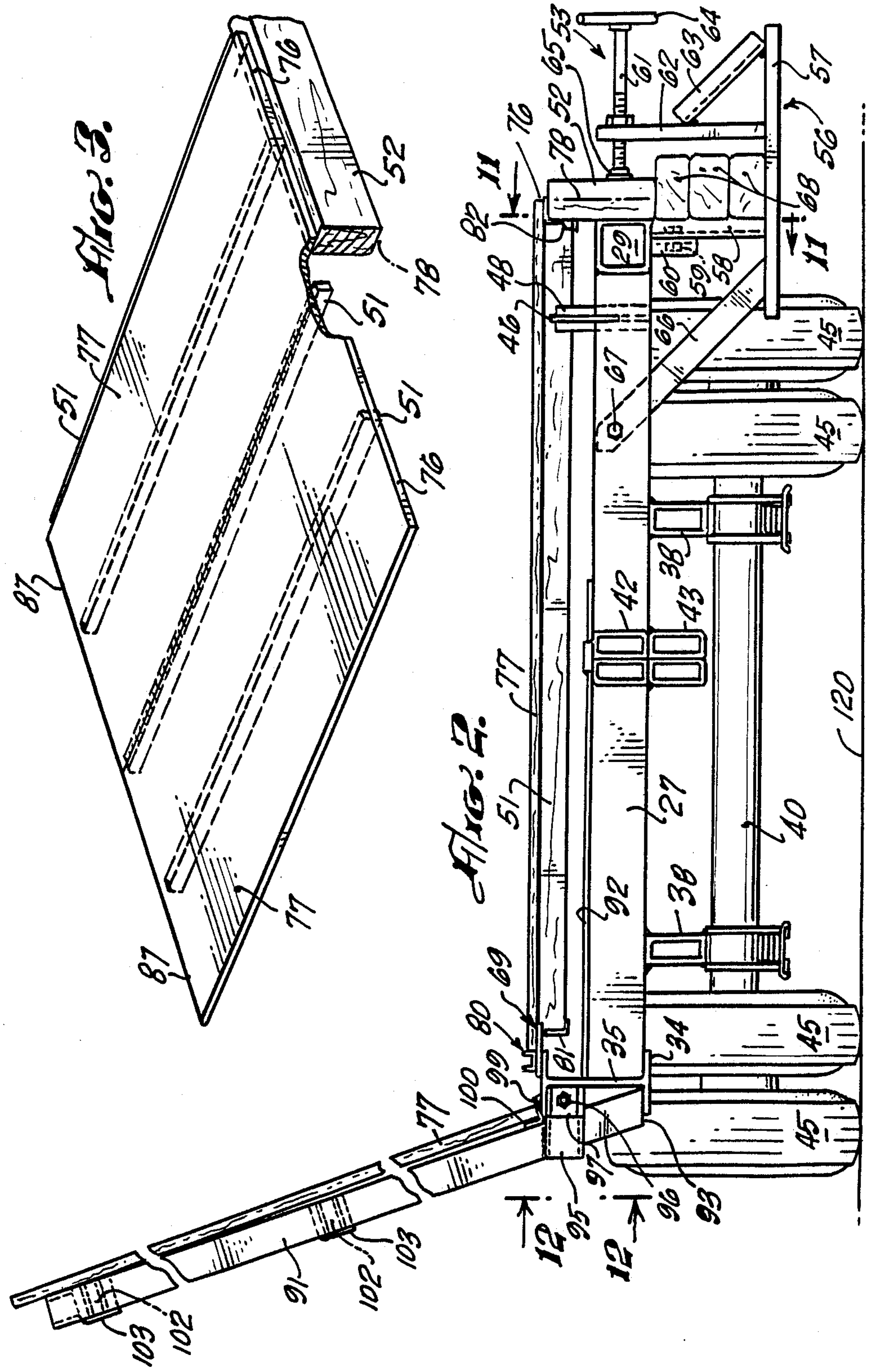
FIG. 2 is an end view from the front of the jig illustrated in FIG. 1, modified by the introduction of panels, sub-purlins (minor beams), and purlin (major beam) onto the jig.
FIG. 3 is a perspective fragmentary view of the physical relationship of assembled panels, sub-purlins and purlin immediately prior to securing all of them together and while mounted on the jig.
Figure 4A:
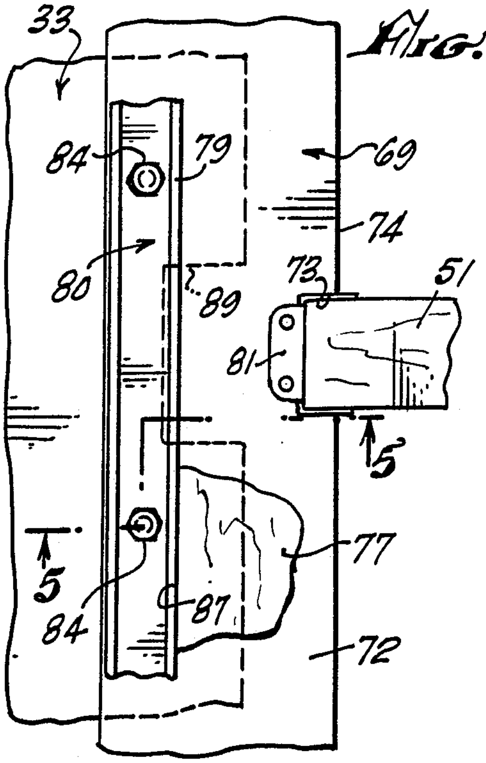
FIG. 4*a* is an enlarged fragmentary plan view of the jig's support frame, the second of a pair of pattern members to which the sub-purlins are mounted, and the means to align joined edges of the panels on the centerline of the purlin.

An aligning means 75, FIGS. 2, 4*a*–4*d*, functions to align the edges 76, FIG. 3, of sequentially joined panels 77 with the centerline 78 of a purlin 52 clamped to its straight or flat edge 54 on longitudinal tubular member 29. Means 75 takes the form of a straight edge 79 on a rigid channel member 80 securely mounted on the second pattern member 69 which in turn is securely mounted to I-beam 33. The plane of straight edge 79 is substantially parallel to centerline 78, and the position of straight edge 79 on pattern member 69 and I-beam 33, i.e., on jig 25, is determined by the particular thickness of the clamped purlin 52. In the illustration of FIG. 4*a*, using 8′ (96″) long panels 77, a 90-¼″ subpurlin 51, and a 5-½″ thickness in purlin 52 (in construction trade lingo, a 6′ beam is spoken of, however, dimensionally its thickness is 5-½″), 2-¾″ of the 8′ long joined panels 77 physically engage the top (thickness) of purlin 52 in order for the joined panel edges 76 to align or coincide with the centerline 78 of the clamped 5-½″ thick purlin 52. Now at the far ends of subperlins 51, mounted in their corresponding notches 73 in pattern member 69, an overhang of 2-¾″ exists for joined panels 77, i.e., 2-¾″ overhang beyond such ends of subpurlins 51 that are mounted in their notches 73. Consequently, straight edge 79 lies in a plane along pattern member 69 that is 2-¾″ from the ends of the subpurlins 51 in notches 73. This accounts for the full 96″ (8′) of the joined panels 77, as the thickness of the portions of each of a pair of hangers 81, 82, FIGS. 2, 5, that are nailed against the end grains of each subpurlin 51 is ⅛″. Thus, ⅛″+⅛″+2-¾″+2-¾″+90-¼″ equals 96″, or the 8′ length of each of panels 77.

It may be noted that in accordance with structural design, the one hanger 81 mounts atop pattern member 69 at the bottom of its corresponding notch 73, while hanger 82 mounts atop the thickness dimension of perlin 52, FIG. 2. The portions of these hangers 81, 82 that respectively hang on pattern member 68 and purlin 52 are about 1/16″ thick, so consequently, no real or substantial interference in the flush relationship of the tops of subpurlins 51 with that of purlin 52 exists. Nor is there any real or substantial interference in nailing the assembled panels 77 to purlin and subpurlins in the final stages of unitizing the roofing scheme on jig 25 and which is generated in the operation of the invention. Also, the width of notch 73 is tailored to the width of hanger 81 so as to form a snug fit which provides assurance that the subpurlins are arranged in paralled manner to one another, particularly in view of the knowledge that in the operation of the invention, the falling of the solid assembled and joined panels 77 onto such subpurlins does not scuttle such arrangements for subsequent nailing purposes.

Aligning means 75 is secured in its place in jig 25 by means of hole-bolt arrangements along the lengths of I-beam 33 (its top flange 70, i.e.), pattern member 69 and channel member 80. A bolt 84, FIGS. 4*a*, 4*d*, is mounted through each of a plurality of spaced holes in a set 85-1 of holes 85, FIG. 4*d*, formed in the longitudinal lengths of the three members 33, 69, 80. A nut 86, FIG. 4*d*, is threaded to each bolt 84 that has been thrust through all members 36, 69, 80 via holes 85, thereby securing all three members together. Thus, straight edge 79 constituting aligning means 75 is fixed to jig 25.

Hereinafter in the description, holes 85 may at times be identified as 85*c* for the hole in the channel member, 85*p* for the hole in the pattern member, and 85*i* for the hole in flange 70 of the I-beam, as it will become apparent that different sets or series 85-1, 85-2, 85-3, FIG. 6, of holes 85, each of such sets of holes comprising a hole 85*a*, 85*p*, and 85*c*, are generated as part of the invention.

Figure 4B:
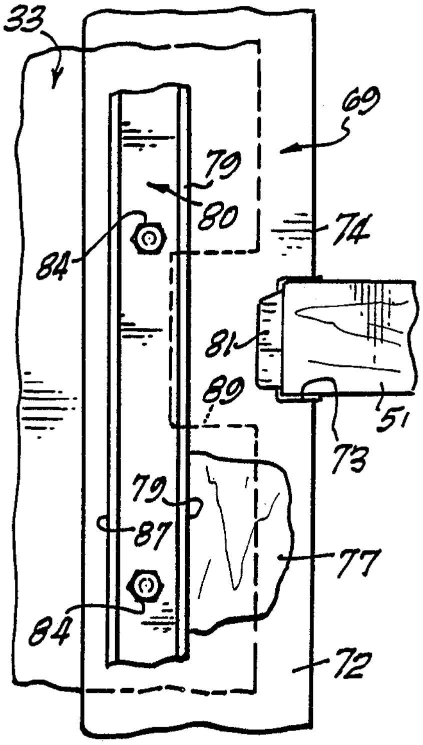
FIGS. 4*b* and 4*c* are fragmentary views similar to that of FIG. 4*a*, however, illustrating the versatility of the invention for the continuing purpose of aligning the assembled panels joined edges to the centerline of purlins having different thicknesses.
Figure 4C:
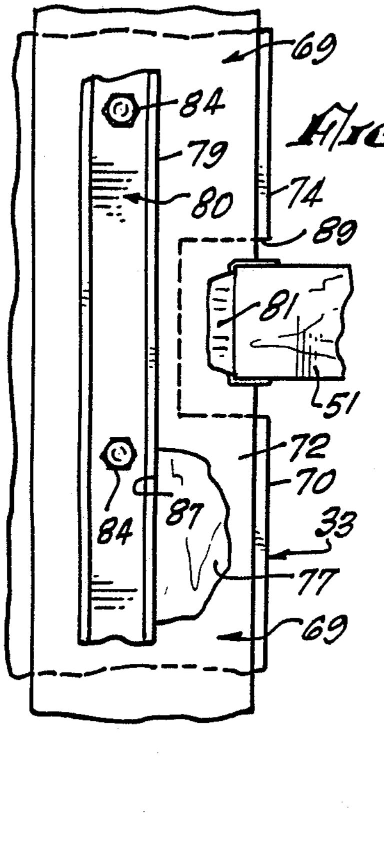
Figure 4D:
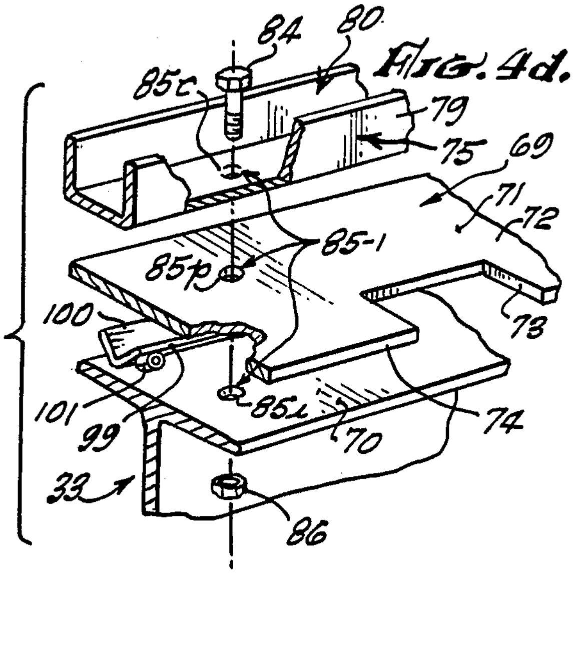
FIG. 4*d* is a perspective exploded fragmentary view of FIG. 5.

FIGS. 4*b*, 4*c*, and 6 illustrate inclusion of a plurality of sets 85-1, 85-2, 85-3 of holes 85 in (flange 70 of) I-beam 33, pattern member 69, and channel member 80 in but one jig 25. Different dimensional thicknesses of perlins 52 are utilized in the roofing construction industry, as well as different lengths of subpurlins 51. Consequently, a plurality of sets of holes 85 is included one jig 25, rather than having a number of jigs each of which accommodating a particular thickness of a purlin 52 or particular length of subpurlin 51. In FIG. 4*b*, a subpurlin 51 of 92-¼″ length is illustrated, and it is assumed, which is the actual case in the construction trade, that the physical thickness of its associated purlin 52 is 3-½″ (a 4″ beam in the trade lingo). Consequently, with an industry availble length of 8′ in the joined panels 77, only 1-¾″ at each end of the 8′ length is available for overhanging subpurlins mounted in notches 50, 73 of pattern members 46, 69 and on which ⅛ hangers are already nailed to both end grains of the subpurlins. One 1-¾″ overhang is to mount on a clamped purlin 52 so that its panels' edges 76 align with centerline 78 on a 3-½″ thick purlin, while the panels' other edges 87, FIG. 3, are included in the second overhang of 1-¾″ beyond the edge of the 92-¼″ subpurlins seated in notches 73, to abut against the straight edge 79 in channel member 80. Thus, pattern member 69 with its fixed depth in its notches 73 is moved laterally towards side 31 of jig 25, while a plurality of a second set of holes 85-2, FIG. 6, formed in pattern member 69, channel member 80 and I-beam 33 register one upon another in order that these three elements can be bolted together, the result being that straight edge 79 is 1-¾″+⅛″ (for thickness of hanger) from the ends of the 92-¼″ subpurlins 51 in notches 73.

Likewise, in FIG. 4*c*, a subpurlin 51 of a 93-¼″ length is illustrated, and here it is assumed that the physical thickness of its associated purlin 52, which is a glue-laminated beam, is 2-½″. Only 1-¼″ is available for overhang in both directions from the two hangers 81, 82 nailed to both end grains of all of the subpurlins 51. Again, pattern member 69 is moved laterally towards side 31 of jig 25, while a plurality of a third set of holes 85-3, FIG. 6, formed in pattern member 69, channel member 80 and I-beam 33 register one upon another in order that these three elements can be bolted together, the result being that straight edge 79 is 1-¼"+⅛" (for thickness of hanger) from the ends of the 93-¼" subpurlins 51 in notches 73.

It is to be noted that as pattern member 69 moves laterally towards side 31 of jig 25, in order that its notches 73 accomodate the increased lengths of subpurlins 51, i.e., from a 90-¼" length to a 92-¼" length to a 93-¼ length, that the holes **85*i*, 85*p* in each set 85-1, 85-2, 85-3 of holes in the I-beam 33 and pattern member 69 move towards side 30 in their locations in their members 33, 69. The reason for this is that the centerline 78 for each purlin 52, as the latter's thickness is reduced, draws nearer side edge 54 of longitudinal tubular member 29 of jig 25. Consequently, the overhang of joined 8' panels 77 is lesser with each purlin having a lesser thickness. Therefore, such lesser overhang along edge 87, FIG. 3, of joined panels 77 abutting straight edge 79 of aligning means 75 is compensated for, by moving the location of holes 85*i*, 85*p* in sets 85-2, 85-3 in an opposite lateral direction in its two members 33, 69, i.e., towards the jig's other side 30**.

Channel member 80 moves laterally to accommodate the location of holes **85*i*, 85*p* in I-beam 33 and pattern member 69. The holes 85*c* in all three sets 85-1, 85-2, 85-3 of holes, of course, are located in the base of channel member 80, and can be in axial alignment with one another. The location of spacing between holes 85*c* in each set 85-1, 85-2, 85-3**, etc., of holes is different from one set of holes to the next set of holes.

It now should be apparent that pattern member 69 and channel member 80 move laterally only, while I-beam 33 remains, of course, stationarily positioned in jig 25, to accomodate the changing lengths in subpurlins 51 and the thickness of purlins 52.

It is to be noted from FIGS. **4*a*–4*c* that a notch 89 also is formed in the inner portion of the top flange 70 of I-beam 33. It is not necessary to the operation of the invention, however, notch 89 in I-beam 33 was formed to accomodate the 93-¼" length of subpurlin 51, FIG. 4*c*, in the initially built jig. Note in FIGS. 4*a*, 4*b*, that notch 89 does not affect the positioning and mounting of the lesser lengthed subpurlins and their hangers 81 in the notch 73 formed in the second pattern member 69. It now should be apparent that engineering design can avoid the necessity of forming notch 89 in I-beam 33, by calculating the locations of the sets 85-1, 85-2, 85-3 of holes 85 in their respective members in relation to the dimensions for such members, and those of the jig as well, in such a manner as to eliminate a notch in the I-beam as channel member 80 is repositioned from one set 85-1 or 85-2 or 85-3 of holes to another to accommodate varying lengths of subpurlins 51 in their notches 73**.

Figure 8:
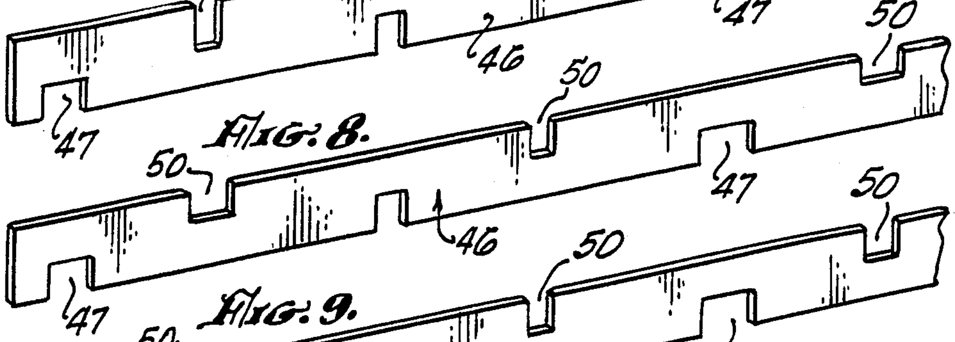
Figure 9:
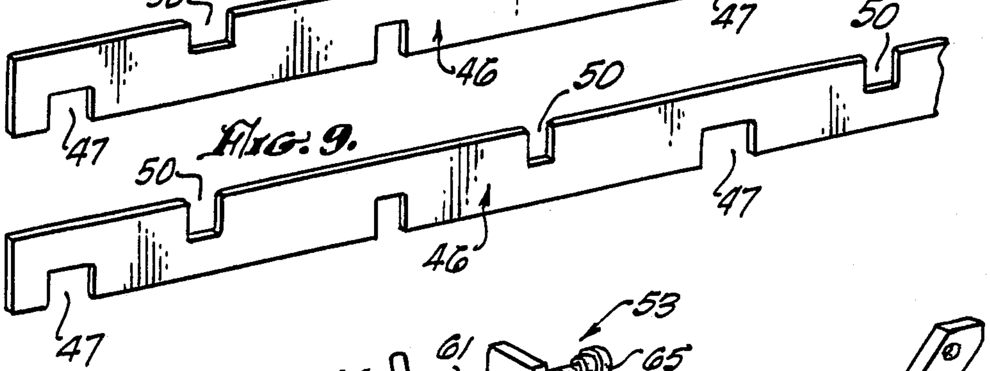
Figure 10:
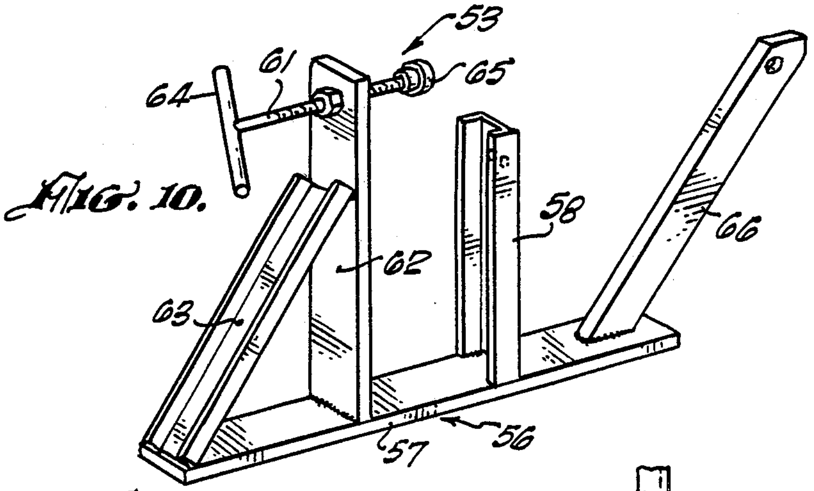
FIG. 10 is a perspective view of a combined beam support and clamping means for a major beam or purlin.
Figure 12:
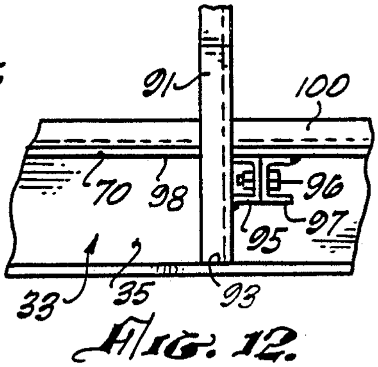
FIG. 12 is a view taken on line 12—12 of FIG. 2.

Means 90 for assembling and joining a plurality of panels 77 prior to incorporating them into a unitized roofing scheme with purlins 52 and subpurlins 51 is illustrated in FIGS. 1, 2 and 12. A plurality of spaced panel support standards 91 are mounted along and above side 31 in a somewhat outwardly inclining manner, making it easy for work personnel standing on a metal grating or "catwalk" 92 secured along and to support frame 26 to mount, assemble and staple panels 77 together while they lean up against such panel support means 90. Standards 91 are formed of suitable steel or other tubular material, with the lower end 93 of each standard 91 caused to seat on the outer portion of lower flange 34 of I-beam 33, FIGS. 2, 11. A horizontally-disposed mounting bracket 95 is welded to each standard 91 and joined to I-beam 33 by means of a bolt-nut arrangement 96 passed therethrough and through another horizontally-disposed mounting bracket 97 welded to the underside 98, FIG. 12, of the outer portion of upper flange 70 of I-beam 33. A level edge 99 with a backing member 100, in the form of an elongated angle-iron member, FIGS. 2, 5, 6 provides a rest for edges 87 of panels 77. Such angle-iron member is securely mounted along and to the topside of upper flange 70 of I-beam 33, such as by a series of spaced nuts 101 welding the angle-iron member to I-beam 33, FIG. 6. Level edge 99 is substantially perpendicular to the standards 91 (though not in the same plane), as a result of such welding. Wooden 2'×4' members 102 are utilized as cross-supports between standards 91 i.e., as backing for the 4'×8' panels 77 to be mounted to means 90 and are held in their positions by suitable hangers 103 known in the construction industry. While sequentially mounted thereon, each panel's 8' edge is stapled to the 8' edge of the next adjacent panel 77, the result of which can be as observed in FIG. 3. Consequently, panels 77 precisely engage and join one another along their 8' lengths, in sequential arrangement one to the next, and the opposing edges 76, 87 of such panels (the combined 4' edges along each edge 76, 87) which will be overhanging the ends of subpurlins 51, are precisely squared to the 8' longitudinal dimension of the assembled and joined panels 77 and to jig 25 and to the subpurlins 51 and purlins 52. FIGS. 7, 8, and 9, illustrate variations in the first pattern member 46 that are useful in roofing construction which at times requires different thicknesses of subpurlins. For example, more nailing space between panel and subpurlin at times is required or desired, remembering that each panel's edge sets only to the centerline of the thickness of the subpurlin to which it is nailed.

FIG. 7 illustrates a pattern member 46 having all of its notches 50 of an actual width (1-9/16") for introduction of 2"×4" or 2"×6" purlins which may be on 24" or 16" centerlines, or whatever the case may be.

FIG. 8 illustrates a pattern member 46 having every other notch 50 of an actual width of 3-9/16" to accommodate 4"×4" and 4"×6" subpurlins. Sometimes additional support or stiffening is desired or required in a roof. Consequently, a greater thickness in some subpurlins is employed, say, at every other panel-edge location or midway the 4' width of a panel.

FIG. 9 illustrates the use of every other notch 50 being of an actual width of 2-7/16" to take 3"×4" and 3"×6" subpurlins.

It now should be apparent that pattern member 46 may include a plurality of spaced notches 50 all of which have the same width or some having greater and some having lesser widths, should it be desired to do so. Or, in other words, notches 50 are designed in width and variation of width in pattern member 46 as determined by what is demanded in the construction of roofs.

In operation of the invention, a plurality of panels 77 are placed on level edge 99, along the plurality of spaced standards 91 and backing braces 102 of assembling means 90, by personnel standing on catwalk 92. As many panels 77 as are desired, they are sequentially arranged along level edge 99 so as to cause the adjoining edges along their 8′ lengths to abut one another. A staple gun or guns (not shown) then staples the abutting 8′ edges together, they being stapled many times along the 8′ length, as seen in FIG. 3. A squared assembly of joined panels results.

In the meantime, or by the same one or more personnel who staple panels 77 together, purlin 52 is clamped to side edge 54 of tubular member 29, using, if necessary, wooden blocks 58 mounted in one or more beam rest supports 56 to cause the top of the purlin 52 to lie in a plane substantially flush with the plane in which the tops of the subpurlins 51 will lie when mounted to pattern members 46, 69. The clamping, of course, is accomplished by turning handle 64 on the jack-screw arrangement 61 so that clamping plate 65 binds purlin 52 to side edge 54. Any horizontal bowing that was in purlin 52 is removed by such clamping, an advantageous outcome in the use of the invention.

Subpurlins 51, with hangers 81, 82 nailed to their opposing end grains, are mounted in cooperating notches 50, 73 of pattern members 46, 69, respectively, the one hanger 81 mounting atop pattern member 69 at the base of its notch 73, while hanger 82 mounts atop the thickness of the clamped purlin 52.

The assembled and joined panels 77 that are setting on assembling means 90 now are removed therefrom, such as by pushing the assembly arcuately down therefrom so that the panels' edges that were at the top of assembling means 90 become the edges 76 shown in FIG. 3. Some shifting longitudinally and laterally of jig 25, of the panels 77, now engaging the tops of subpurlins 51, is manually performed, in order to abut edge 87 of the panels completely against straight edge 79 of aligning means 75, and to cause the stapled edges of panels 77 to align with the centerlines of subpurlins 51 mounted in notches 50, 73 of pattern members 46, 69, respectively. Once this is done, the overhang of panels 77 on purlin 52 automatically aligns their edge 76 to the centerline 78 of purlin 52. Nailing then is accomplished, all panels to purlin, and all panels to all subpurlins. A unitized roofing scheme results.

Figure 16:
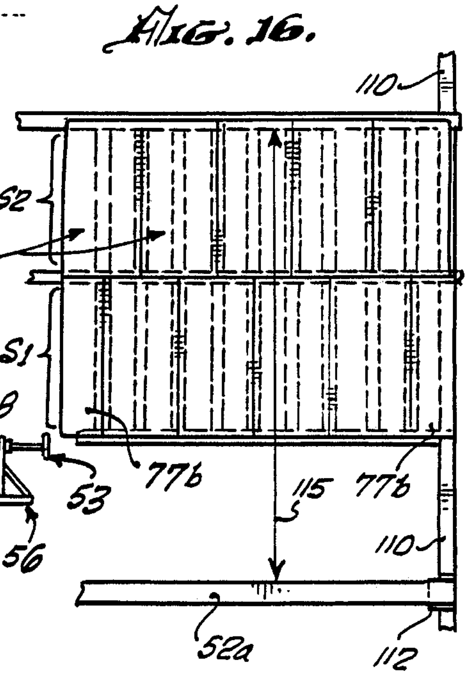
FIG. 16 is a fragmentary plan view of unitized roofing schemes mounted on a roof in accordance with the invention.

The clamping means 53 are released. A lifting mechanism 105, FIG. 15, such as a lift fork machine utilized in construction work, is brought to bear. Its forks are inserted under jig 25, in its center from side 30, to engage the bottom of purlin 52 and the undersides of panels 77 after the release of clamping means 53. The forks are raised slightly to free the unitized roof scheme from its rest position in jig 25. The fork lift machines 105 moves laterally away from jig 25, carrying the entire weight of the unitized roofing scheme. Once completely clear of jig 25, the machine moves to a location adjacent the building skeleton 106, FIG. 16, on which the scheme is to be mounted. Its forks lift the entire scheme to roof height, and in accordance with practice, move into mount the scheme in a manner so as to result in the illustration of FIG. 16. A purlin **52*a* already has been mounted in place, perpendicular to carrying beams 110, one of which is shown in FIG. 16. The tops of these two beams 52*a*, 110 have previously been made flush with one another by hangers 112, one of which being shown in the lower bottom right of the FIGURE at, say, a corner of the building skeleton. Each unitized scheme is dropped into place, the overhang of edge 87 of panels 77 mounting to and analog an exposed one-half thickness of a previously installed or mounted purlin 52*a*. The purlin 52 which is part of the scheme being mounted is set on already erected carrying beams 110 to which a number of these schemes is to be mounted. The means of hangers 112**, an already known practice in the construction trades, performs this task.

FIG. 16 also illustrates staggering of the roofing schemes along a bay 115, from one section s1 of the bay to its next section s2. In such a case, a half-panel **77*b* is utilized in the invention, and is one of the panels initially mounted on panel support means 90** during the course of operation of the invention.

Figure 13:
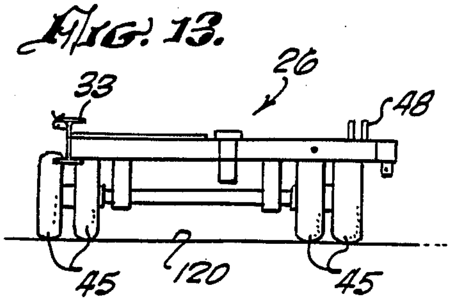
FIGS. 13, 14, and 15 are front end views of the jig, in terms of illustrating steps of processing the panels, subpurlins and purlin in the method and operation of the invention.
Figure 14:
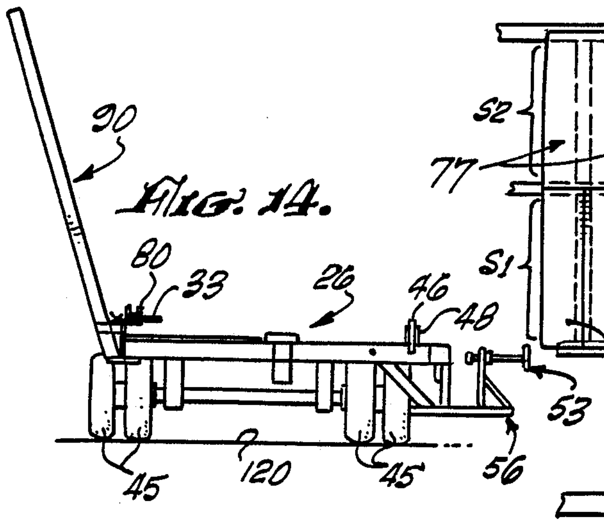
Figure 15:
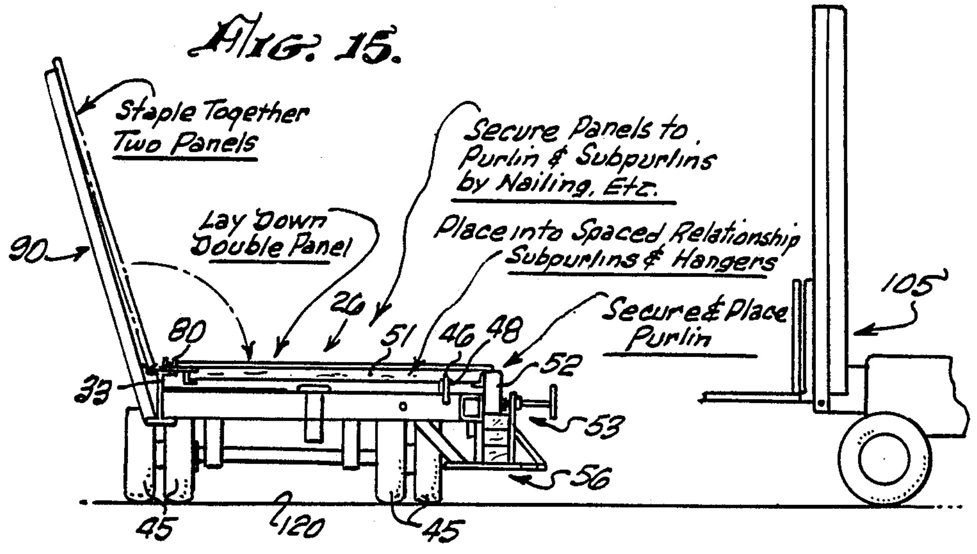

FIGS. 13–15 illustrate the inventive method. After setting up jig 25, FIG. 13, on, say, a ground support 120, preferably level, panel support means 90, FIG. 14, then is assembled to the support frame 26 as described below. Also, each of the major beam support rests 56 and clamping means 53, i.e., as many as are necessary, are mounted to support frame 26 as described above. Purlin 52, FIG. 15, is put in a position adjacent flat edge 54 (FIG. 11) of tubular member 29, and adjustably elevated to its proper height, if necessary, by wooden blocks 58, securely mounting it, such as by clamping means 53, to jig 25. Subpurlins 51, with hangers 81, 82 nailed to their end grains, are placed or mounted in spaced parallel relationship in their corresponding cooperating notches 50, 73 of their respective pattern members 46, 69. Hangers 81 mount atop member 69 at the closed base of notches 73 while hangers 82 seat atop the thickness of clamped purlin 52. The tops of both the purlin 52 and subpurlins 51 are substantially flush and planar thereby.

At least two panels 77 are joined together along their 8′ lengths as they rest on level edge 99, while leaning against panel support means 90, thereby being squared to one another. Securing by stapling of the panels 77 is accomplished thereat, prior to laying down the assembled, joined and secured-together panels 77 upon the spaced subpurlins 51 mounted on jig 25 in their pattern members 46, 69.

The secured-together panels 77 are aligned against straight edge 79 of aligning means 75, thus again being squared to the subpurlins 51 and purlin 52 mounted to jig 25, and resulting in the exposed edge 76 of the joined panels, overhanging the subpurlins, to be aligned with the centerline 78 of clamped purlin 52. The step of securing, such as by nailing, the joined panels, subpurlins and purlin together follows. A unitized roofing scheme thus is generated. After the last step, the scheme is mounted in place in its position in the roof area of a building skeleton.

The assembly of jig 25 is accomplished partly by prefabricating support frame 26 and fixedly mounting same upon the portable leaf spring-and-tire assembly described above, or the frame 26 can be fabricated directly onto such spring-leaf-and-tire assembly, such as by welding. The angle-iron member with level edge 99 and catwalk 92 are included in such fabrication, along with notches 89 if necessary. The remainder of the jig's assembly occurs at each construction site. Pattern member 46 is mounted into bifurcated brackets 48 as its bottom slots 47 mount upon tubular members 27, 28 and 37. Taking the set 85-1 of holes 85 as an example, spaced holes **85*c* and 85*p* are registerably mounted to spaced holes 85*i*, and thereafter bolts 84 and nuts 86 secure members 80, 69, and 33 together, thereby presenting notches 73 in pattern member 69 to accept subpurlins 51 of a 90-¼″ length. Each standard 91 is mounted along side 31 of support frame 26, its bottom edge 93 resting on the outer portion of top flange 70** while mounting brackets 95, 97 are engaged in a manner for bolt-nut arrangement 96 to secure standard 91 to I-beam 33. Cross-braces 102 are mounted by their hangers 103 to standards 91. Each hanger 66 is pivotally attached to one of the tubular members 27, 28, 37, and then each hanger 58 is attached to a corresponding depending bracket 57.

Suitable materials, steel being an example, is utilized in the fabrication of jig 25, as it is apparent that its entire structure requires strength for repeated uses. The elements themselves, described above, are fabricated by known techniques and processes. Hangers 81, 82, 103, 112 are of standard galvanized steel fabrication and known in the construction trades, as are the purlins, subpurlins, and carrying beams.

Various changes or modifications in the disclosure may be made without changing the spirit or scope of the invention. For example, limited depths of webs in presently avilable I-beams prevent a jig from accepting a 2"×10" purlin, however, the invention is readily adaptable to purlins of such a depth or any other depth, where a web of the I-beam 33 or equivalent thereof accepts such a depth for a purlin 52.

Sets 85-1, 85-2, 85-3 of holes 85, FIG. 6, could all lie in a single line in plate 72 and in top flange 70 of I-beam 33, the single line being parallel to the widths of such members, rather than each set being off-center to one another as shown in FIG. 6. In such a case, only one hole would be required in channel member 80 were the holes in each set formed on center with themselves on such a line. In either context, this plurality of a plurality of sets of holes provides a means to change the distance between pattern members 46, 69 to thereby accommodate the mounting of different lengths of minor beams in the notches 73 of pattern member 69. The means for holding pattern member 46 in its vertically-oriented working position, as illustrated by bifurcated brackets 48, need not be limited to such form or brackets. The grating or catwalk 92 itself is welded to support frame 26, and as now apparent assists working personnel in the utility of the invention even though it is disposed below subpurlins 51 mounted in their pattern members 46, 69. Further, it assists in keeping support frame 26 perfectly square. It also should be apparent that the manner of locating and drilling of holes 85 in each set 85-1, 85-2, 85-3, etc., need not be limited to but one way. One example of one way of locating and drilling each set of holes is to seat channel member 80 and plate 72 on I-beam 33, registering there ends together at the rear of support frame 26, say, as against a side of tubular member 28. Then each set of holes is drilled through such members, which are mounted one on top of the other, spacedly along longitudinal side 31, for a given length in subpurlin 51 as it it were or is mounted in notches 50, 73 (with hangers 81, 82). Then, laterally move channel member 80 and plate 72 to a next position which reflects a different length of such a mounted subpurlin 51 and hangers 81, 82 in its notches 50, 73. And so on, until a sufficient number of holes 85 along side 31 for each set 85-1, etc., have been formed so as to be able to produce a secure mounting of members 33, 72 and 80 by means of bolts 84 and 86 in each of such holes. FIG. 6 illustrates the present embodiment of the invention and which was obtained by the above described manner of making holes 85. Also, it should be understood that in the event a notch 89 is included in I-beam 33, it should be wider than the width of notch 73 in pattern member 69, so that interference does not occur between the end of a subpurlin 51 (with its hanger 81) and notch 73 into which such end and hanger are deposited. In other words, notch 73's silhouette lies within that of notch 89, regardless of the length of subpurlin 51 and its attached hanger 81. Further, standards 91 may be located close enough to one another to eliminate braces 102 and still provide firm backing in a plane for panels 77 assembled, joined and secured thereon.

I claim:

1. A method of forming a unitized roofing scheme including joined panels, a major beam having a top, and minor beams having tops, comprising securely mounting the major beam to a flat edge on a rectangularly-configured jig, placing in transversely spaced parallel relationship to one another the minor beams by mounting them in fixed positions in the jig perpendicular to the flat edge, the tops of said major and minor beams being substantially flush and planar withh one another by such placing, laying at least two panels atop the minor beams with edges thereof over the centerline of a minor beam, aligning the laid panels on the jig so that an exposed edge of the panels overhangs the placed minor beams to the extent of aligning the exposed edge upon the centerline of the securely mounted major beam, and securing the panels, minor beams and major beam together.

2. The method of claim 1 including the step of fastening the panels together prior to the aligning step.

3. The method of claim 2 including the step of securing together the fastened panels prior to the aligning step.

4. The method of claim 2 wherein the fastening step is performed before laying the panels atop the minor beams.

5. The method of claim 4 including the step of securing together the fastened panels.

6. The method of claim 1 including the steps of fastening and securing together the panels themselves prior to the laying step.

7. The method of claim 2 including the step of fastening the panels themselves prior to the laying step.

8. The method of claim 1, 2, 3, 4, 5 or 6 including the step of adjustably elevating the top of the major beam prior to securely mounting it to the flat edge.

* * * * *

UNITED STATES PATENT AND TRADEMARK OFFICE

CERTIFICATE OF CORRECTION

PATENT NO. : 4,796,350

DATED : January 10, 1989

INVENTOR(S) : CHRISTOPHER W. FRENCH

It is certified that error appears in the above-identified patent and that said Letters Patent is hereby corrected as shown below:

In column 12, line 29, read "withh" as --with--.

In column 12, line 55, read "claim 1, 2, 3, 4, 5 or 6" as -- claim 1, 2, 3, 4, 5, 6 or 7 --.

Signed and Sealed this

Twenty-seventh Day of June, 1989

*Attest:*

DONALD J. QUIGG

*Attesting Officer*

*Commissioner of Patents and Trademarks*